United States Patent [19]

Sato et al.

[11] Patent Number: 4,589,021

[45] Date of Patent: May 13, 1986

[54] GAMMA COMPENSATING CIRCUIT

[75] Inventors: Joichi Sato, Atsugi; Ryuji Shiono, Machida; Tsutomu Niimura, Hiratsuka; Toshiaki Isogawa; Mitsuru Sato, both of Atsugi, all of Japan

[73] Assignee: Sony Corporation, Tokyo, Japan

[21] Appl. No.: 568,258

[22] Filed: Jan. 4, 1984

[30] Foreign Application Priority Data

Jan. 7, 1983 [JP] Japan ............................ 58-861
Jan. 14, 1983 [JP] Japan ............................ 58-3760

[51] Int. Cl.⁴ .................. H04N 5/202; H04N 5/57; H04N 9/69
[52] U.S. Cl. .................................. 358/164; 358/169; 358/32
[58] Field of Search ............... 358/164, 166, 32, 172, 358/169, 168, 34; 328/142, 145, 144; 307/490, 491, 492, 503, 261, 263, 264, 494

[56] References Cited

U.S. PATENT DOCUMENTS

| | | | |
|---|---|---|---|
| 3,935,478 | 1/1976 | Okada et al. ................. | 307/491 |
| 4,015,079 | 3/1977 | Satou et al. .................. | 358/164 |
| 4,218,706 | 8/1980 | Brinegar et al. ............ | 358/172 |
| 4,393,406 | 7/1983 | Lehmann ...................... | 358/160 |

Primary Examiner—James J. Groody
Assistant Examiner—David E. Harvey
Attorney, Agent, or Firm—Lewis H. Eslinger; Alvin Sinderbrand

[57] ABSTRACT

A circuit having a nonlinear response characteristic provides gamma compensation to a video luminance signal and matches any desired output response curve by selecting the number of diodes connected as series-connected circuits in the compensation circuit. The relationship among the various numbers of series-connected diodes is dependent upon having a current flowing into an output circuit which is the same as a current flowing out of a collector circuit of a differential amplifier, to which the input video luminance signal is applied, and through series-connected diode circuit. These currents are maintained equal by use of a current-mirror circuit, which provides an input current to an output transistor that has in its emitter circuit one of the series-connected diode circuits, and the compensated luminance signal flows in the collector circuit thereof. The differential amplifier is stabilized and balanced by a difference amplifier connected in feedback across the collector leads of the differential amplifier in conjunction with a pedestal clamping synchronization signal and a capacitor to provide a balancing signal at the base lead of the second transistor of the differential transistor amplifier.

20 Claims, 5 Drawing Figures

1

GAMMA COMPENSATING CIRCUIT

BACKGROUND OF THE INVENTION

1. Field of the Invention

This invention relates generally to circuits having a nonlinear response characteristic and, more particularly, to a circuit having a nonlinear response characteristic for use in providing gamma compensation in a video camera.

2. Description of the Prior Art

It is well known that a color picture tube has a nonlinear transfer characteristic, however, the pick-up tube in a video camera has essentially a linear response characteristic. Therefore, in order to produce a pleasing color picture, the transfer characteristic of the pick-up camera must be compensated in the reciprocal manner relative to the picture tube characteristic. Such compensation is typically referred to as gamma compensation, in which gamma is understood to be the slope of a log-log plot of the light transfer characteristic.

Gamma-compensation circuits are designed using a number of series-connected diodes to provide the required nonlinear response characteristics, in which the principal that the voltage across a diode is approximately proportional to the square root of the current through such diode is advantageously employed. Some known gamma-compensation circuits are temperature dependent and, thus, this characteristic presents a drawback to the use of such circuits. Other known gamma compensation circuits have a direct current component in the nonlinear transfer function, which adversely affects the stability of the gamma compensation circuit.

Other known techniques for constructing gamma-compensation circuits employ using several gamma-compensating circuits in series, so that different portions of the nonlinear curve can be provided by different, individual, compensation circuits. Nevertheless, matching of these circuits is quite difficult and this technique has generally been not effective.

OBJECTS AND SUMMARY OF THE INVENTION

Accordingly, it is an object of the present invention to provide a circuit for providing gamma compensation which can eliminate the above-noted defects inherent in the prior art.

Another object of this invention is to provide a gamma-compensation circuit that is essentially temperature independent and is stable for all practical temperatures.

A further object of this invention is to provide a gamma compensation circuit in which no DC is present in the non-linear portion of the circuit so that the gamma compensation circuit is stable regardless of the input waveform.

In accordance with one aspect of the present invention, gamma compensation is provided using a current source and plurality of diodes to provide the basic gamma compensation curve, however, the luminance signal that comprises the signal to be gamma compensated is fed to a differential amplifier formed of a transistor pair and having one or more diodes connected in series between the collectors, with one collector being connected to ground through another series-connected diode circuit. The luminance signal is fed to one base lead of this differential transistor amplifier and the other base lead is clamped at the pedestal level of the luminance signal by a capacitor and feedback circuit that sets both collector voltages at the same level. This system eliminates any DC voltage levels present in the actual luminance signal current and by using a current mirror circuit a gamma-compensation characteristic represented by one of several different exponential powers is available.

The above and other objects, features, and advantages of the present invention will become apparent from the following detailed description of illustrative embodiments thereof to be read in conjunction with the accompanying drawings, in which the same reference numerals identify the corresponding elements and parts in the several views.

DETAILED DESCRIPTION OF PREFERRED EMBODIMENTS

Figure 1:
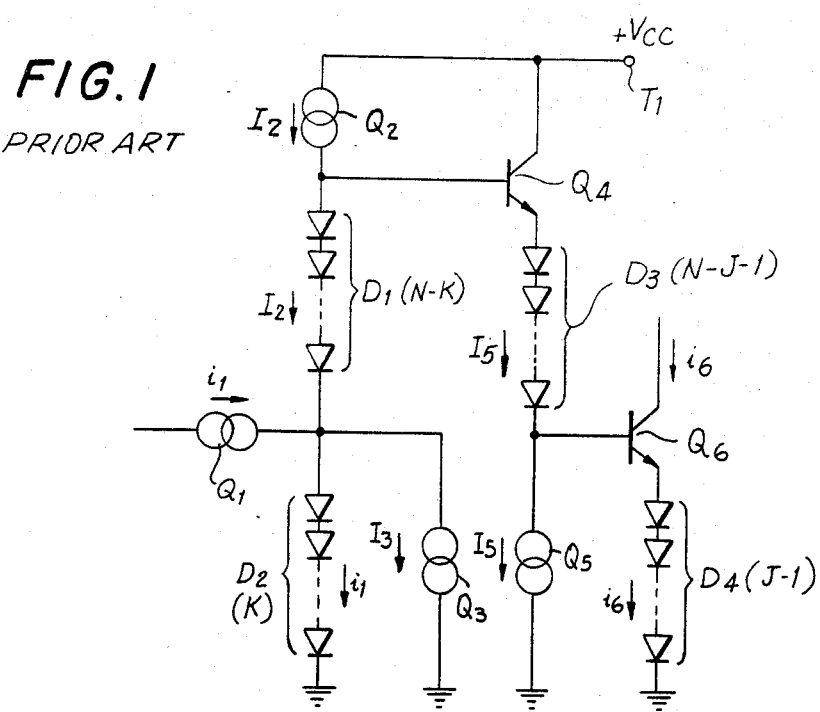
FIG. 1 is a schematic diagram of a gamma-compensation circuit known in the prior art.

A known gamma-compensation circuit that provides the required non-linear transfer characteristic is shown in FIG. 1, in which a constant current source $Q_2$, series-connected diodes $D_1$, and series-connected diodes $D_2$ are all arranged in series between a voltage supply terminal $T_1$ and ground or reference potential. The numbers of diodes $D_1$ and $D_2$ in each series-connected circuit are represented by N-K and K, respectively. At the junction between the first circuit of series-connected diodes $D_1$ and the second circuit of series-connected diodes $D_2$ the output of a constant-current source $Q_1$ is connected. The input of the constant-current source $Q_1$ corresponds to the video luminance signal, and another constant-current source $Q_3$ is connected to ground potential in parallel with the series-connected diode circuits $D_2$. Also connected between the supply voltage terminal $T_1$ and ground potential is the collector-emitter junction of transistor $Q_4$, a third series-connected diode circuit $D_3$, and another constant-current source $Q_5$. The base drive for transistor $Q_4$ is provided at the junction of the output of constant-current source $Q_2$ and the input of the first diode circuits $D_1$. The output of the gamma-compensation circuit of FIG. 1 is taken from transistor $Q_6$ that has a base lead connected at the junction formed at the end of the third diode circuit $D_3$, and the input to constant-current source $Q_5$. Transistor $Q_6$ is further connected with its collector lead connected to ground through a fourth circuit of series-connected diodes $D_4$. The number of diodes $D_4$ in this fourth circuit is represented as J-1.

Analyzing the operation of the gamma-compensation circuit of FIG. 1, it is seen that current $i_1$ represents the input luminance signal current through constant-current source $Q_1$ and $i_6$ is the output signal flowing in the collector circuit of transistor $Q_6$. $I_2$ is the current flowing due to constant-current source $Q_2$, current $I_3$ is the current flowing due to constant-current source $Q_3$, and current $I_5$ is the current flowing due to constant-current source $Q_5$. The saturation current of diodes $D_1$-$D_4$, inclusively, is represented by $I_s$, as is the base-emitter path current of transistors $Q_4$ and $Q_6$. The variables used in defining the number of diodes in each of the various series-connected diode circuits, that is, N, J, and K are all positive integers equal to or larger than 1. It is the numbers of these diodes that determine the shape of the nonlinear compensation curve.

Therefore, assuming that:

$$I_2 = I_3 \quad (1)$$

only the input signal current $i_1$ flows through the diode circuit $D_2$ and, because the terminal voltage of the series-circuit made up of diodes $D_1$ and $D_2$ must be the same as the terminal voltage of the series circuits of the base-emitter paths of transistors $Q_4$ and $Q_6$ and diode circuits $D_3$ and $D_4$, respectively, then the following equations can be obtained.

$$(N-K)(kT/q)\ln(I_2/I_s) + K(kT/q)\ln(i_1/I_s) = (N-J)(kT/q)\ln(I_5/I_s) + J(kT/q)\ln(i_6/I_s) \quad (2)$$

and, thus:

$$(I_2/I_s)^{N-K} \cdot (i_1/I_s)^K = (I_5/I_s)^{N-J} \cdot (i_6/I_s)^J \quad (3)$$

$$i_6 = \alpha i_1^{K/J} \quad (4)$$

where:

$$\alpha = [I_2^{(n-k)/j} / I_5^{(N-J/J)}] \quad (5)$$

and k=Boltzman's constant;
T=absolute temperature in K°; and
q=charge of an electron in electron volts Therefore, as evidenced by equation (4), the various different gamma characteristics can be obtained by selecting different values of J and K which correspond to the number of diodes $D_1$, $D_2$, $D_3$, and $D_4$, utilized in the circuit. Note particularly that equation (4) does not contain any term that is temperature dependent and, accordingly, the temperature stability characteristics of the gamma compensation circuit shown in FIG. 1 are relatively good. Nevertheless, in the circuit of FIG. 1 equation (1) was assumed in order to derive equation (4) and if it is not possible to obtain the situation of equation (1), then equation (4) becomes $$i_6 = \alpha(I_2 - I_3 + i_1)^{K/J} \quad (6)$$

Thus, the desired gamma-compensation characteristic can not be obtained because there is a DC component ($I_2-I_3$) contained in equation (6). This DC component ($I_2-I_3$) is the difference between the direct currents $I_2$ and $I_3$ and affects the initial rise-time portion of the low-level signal of the gamma-compensation characteristic, and to eliminate this DC component currents $I_2$ and $I_3$ are required to equal each other at the low current level, that is, at the commencement of the current wave corresponding to the pico-ampere region of the current response curve. As might be expected, it is very difficult to have two current waveforms coincide exactly within such close tolerances as the pico-ampere range and, thus, considering the temperature characteristic, stable operation of the gamma-compensation circuit of FIG. 1 can not realistically be expected. Furthermore, since the voltage at the junction of diode circuits $D_1$ and $D_2$ decreases as the gamma-compensation curve rises, it is difficult to monitor or detect the current $I_3$ in a stable fashion.

One approach which may appear possible is to create the desired gamma-compensation characteristic curve by combining a first gamma characteristic and a second gamma characteristic, that is, by adding two different output signals from two gamma-compensation circuits. However, this approach is not particularly feasible, since if the currents $I_2$ and $I_5$ of the circut that produces the first desired gamma characteristic and the currents $I_2$ and $I_5$ of the second gamma characteristic circuit are not equal, respectively, the co-efficient $\alpha$, as represented in equations (4) and (5) will be different and, therefore, it is not possible to combine the two circuits to produce the desired gamma-compensation characteristic.

Figure 2:
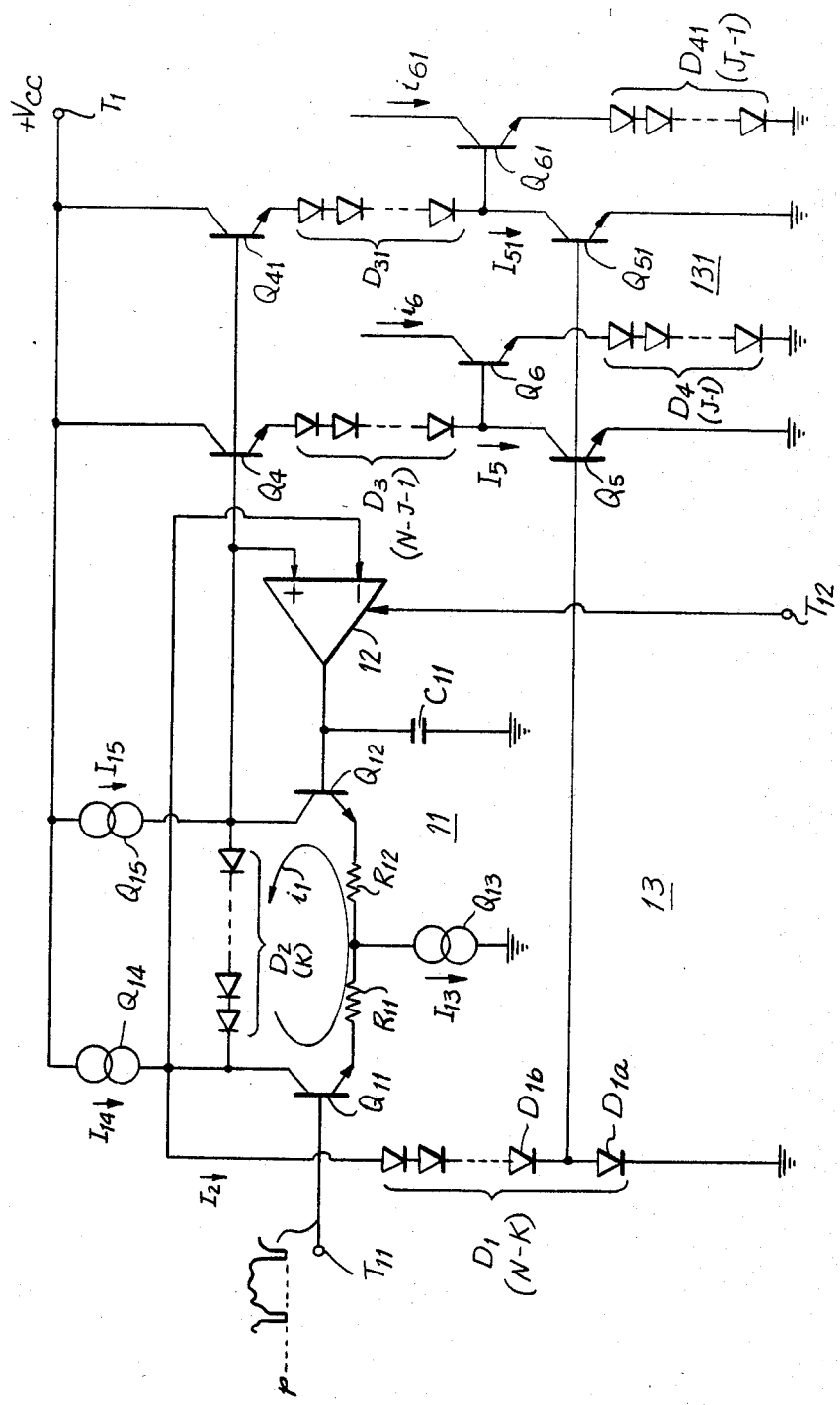
FIG. 2 is a circuit diagram of a gamma-compensation circuit according to an embodiment of the present invention.

An embodiment of the present invention shown in FIG. 2 overcomes the above problems and eliminates DC currents that might be present in the gamma-compensation circuit. Specifically, a differential amplifier 11 is provided at the input of the gamma-compensation circuit and resistors $R_{11}$ and $R_{12}$ are connected in series between the emitter leads of respective transistors $Q_{11}$ and $Q_{12}$. The junction of resistors $R_{11}$ and $R_{12}$ is connected to ground potential through constant-current source $Q_{13}$, and these circuit elements combine to form the differential amplifier 11. The input signal, which may be a video luminance signal, is applied at input terminal $T_{11}$ and fed to the base lead of transistor $Q_{11}$. The collector leads of transistors $Q_{11}$ and $Q_{12}$, respectively, are connected to a bias supply voltage $V_{cc}$ at terminal $T_1$ through constant-current sources $Q_{14}$ and $Q_{15}$, respectively. Additionally, the collector circuits of transistors $Q_{11}$ and $Q_{12}$ are connected together by series connected diodes $D_2$, of a number represented by the variable K. The collector circuit of transistor $Q_{11}$ is connected to ground potential through a series connected diode circuit $D_1$, the number of diodes in which is represented by N-K.

The base circuit of transistor $Q_{12}$ is driven by the output of a difference amplifier 12 that is connected at its plus and minus inputs to the collector circuits of transistors $Q_{12}$ and $Q_{11}$, respectively. The input lead of transistor $Q_{12}$ is voltage clamped by capacitor $C_{11}$ that is connected between the base lead of transistor $Q_{12}$ and ground potential. The voltage difference amplifier 12 driving the base of transistor $Q_{12}$ is supplied with clamping sync pulses at terminal $T_{12}$ that are in time with the DC pedestal level of the video luminance signal fed in at terminal $T_{11}$.

The constant-current source $Q_5$ of FIG. 1 is embodied in part in the inventive circuit of FIG. 2 by transistor $Q_5$ and output transistors $Q_4$ and $Q_6$ and series-connected diode circuits $D_3$ and $D_4$ are connected in the circuit of FIG. 2 as discussed hereinabove in regard to FIG. 1. The base circuit of transistor $Q_4$ is driven by the collector circuit of transistor $Q_{12}$, and the base lead of transistor $Q_5$ is connected to a junction between diodes in the series-connected diode circuit $D_1$. Specifically, base lead of transistor $Q_5$ is connected to the junction of the first diode $D_{1a}$ and the second diode $D_{1b}$ of diode circuit $D_1$, and the other end of diode $D_{1a}$ is connected to ground potential. Diode $D_{1a}$ and transistor $Q_5$ comprise current mirror circuit 13, the importance of which to the present invention will be seen hereinbelow. Transistors $Q_{41}$, $Q_{51}$, $Q_{61}$ and diode circuits $D_{31}$ and $D_{41}$ correspond to transistors $Q_4$, $Q_5$, and $Q_6$ and diode circuits $D_3$ and $D_4$, respectively, and are connected in the same fashion. Note that diode $D_{1a}$ and transistor $Q_{51}$ comprise current-mirror circuit 131.

In the inventive circuit of FIG. 2, currents $I_{13}$, $I_{14}$, and $I_{15}$ produced by constant current sources $Q_{13}$, $Q_{14}$, and $Q_{15}$, respectively, may have typical values of: $I_{13}=400$ micro amps; $I_{14}=200$ micro amps; and $I_{15}=300$ micro amps. The positive luminance input signals applied at terminal $T_{11}$ results in the signal current component flowing in a loop formed by the differential amplifier as indicated by arrow $i_1$ and in which the loop is comprised of transistor $Q_{11}$, resistors $R_{11}$, $R_{12}$, transistor $Q_{12}$, and diode circuit $D_2$. When the level of the input signal goes to zero, that is, during the time when the input signal is on its pedestal level, as represented by the dashed p line relative to the waveform applied at input terminal $T_{11}$, the voltage comparator or difference amplifier 12 works to equalize the collector voltages of transistors $Q_{11}$ and $Q_{12}$, so that no direct current component can flow through diode circuit $D_2$. That is, when the input luminance signal is at the pedestal level, the comparator 12 is operative by way of the clamping sync pulse fed in at terminal $T_{12}$. Clamping is well known and the sync pulses are generally available, since clamping is necessary to provide a reference for reinsertion of DC voltage levels which are lost when the luminance signal is passed through RC-coupled stages. The difference amplifier 12 compares the collector voltages of transistors $Q_{11}$ and $Q_{12}$ and produces a comparison output voltage signal that is clamped by clamping capacitor $C_{11}$ and fed to the base circuit of transistor $Q_{12}$. Thus, the collector voltages of transistors $Q_{11}$ and $Q_{12}$ are forced to be equal, no direct current can flow through diode string $D_2$ and the only current signal present is the input signal component $i_1$.

Therefore, assuming that the only current flowing through series-connected diode circuit $D_1$ is current $I_2$ then the following current equation can be made:

$$I_2 = I_{14} + I_{15} - I_{13} \quad (6)$$

Thus, the constant element of direct current $I_2$ flows through diode circuit $D_1$, and no current component of the input signal $I_1$ flows in this diode string. Furthermore, the series-connected diode circuits $D_1$ and $D_2$ are connected in the base circuit of transistor $Q_4$. Based upon the above it is seen that the gamma compensation circuit of FIG. 2 is substantially the equivalent functionally to the circuit of FIG. 1, except that the DC component has been removed. Thus, equation (4) hereinabove applies equally to the circuit of FIG. 2 and moreover the same equation relative to current $i_6$ applies as follows:

$$i_6 = a i_1^{K/J_1} \quad (8)$$

Where the number of diodes in diode circuit $D_{41}$ equals $J_1$ minus one $(J_1-1)$. Thus, both current $i_6$ and $i_{61}$ provide gamma-compensation characteristics relative to the input signal current $i_1$.

Current-mirror circuits 13 and 131 are formed of transistors $Q_5$ and diode $D_{1a}$ and transistor $Q_{51}$ and diode $D_{1a}$, respectively, and the collector currents $I_5$ and $I_{51}$ of transistors $Q_5$ and $Q_{51}$, respectively, can be represented by the following:

$$I_5 = I_2 = I_{51} \quad (9)$$

Therefore, the equations (4) and (8) hereinabove can be rewritten as normalized by currents $I_2$ as follows:

$$(i_6/I_2) = (i_1/I_2)^{K/J} \quad (10)$$

$$(i_{61}/I_2) = (i_1/I_2)^{K/J_1} \quad (11)$$

Thus, equations (10) and (11) represents the output currents $I_6$ and $I_{61}$ that have been standardized or equalized by the current $I_2$ and which produce exponential functions of the input signal $i_1$ to the power $K/J$ and $K/J_1$, respectively.

Figure 3:
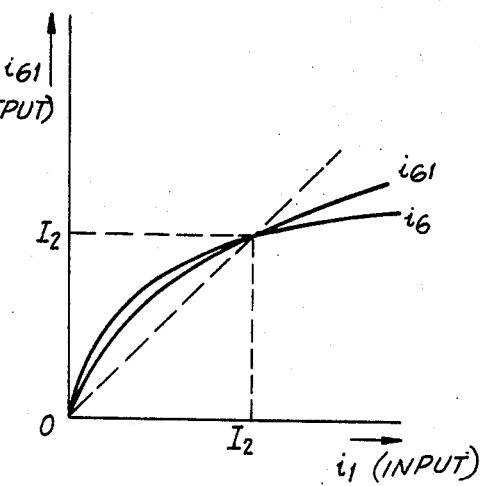
FIG. 3 is a graph of a gamma-compensated output signal produced by the inventive circuit of FIG. 2.

FIG. 3 represents the gamma-compensation characteristics of the circuit of FIG. 2 and typically shown are the curves representing the compensated currents $I_6$ and $I_{61}$. Note that if the two currents are added then a different compensation characteristic would be provided. Equation (4) indicated that a desired gamma-compensation was possible and the curves of FIG. 3 bear this out. Additionally, note that while the circuit of FIG. 1 could provide the desired gamma-compensation characteristic curve it was not always possible, whereas the circuit of FIG. 2 does not depart from the desired gamma-compensation curve but provides it in stable fashion.

Figure 4:
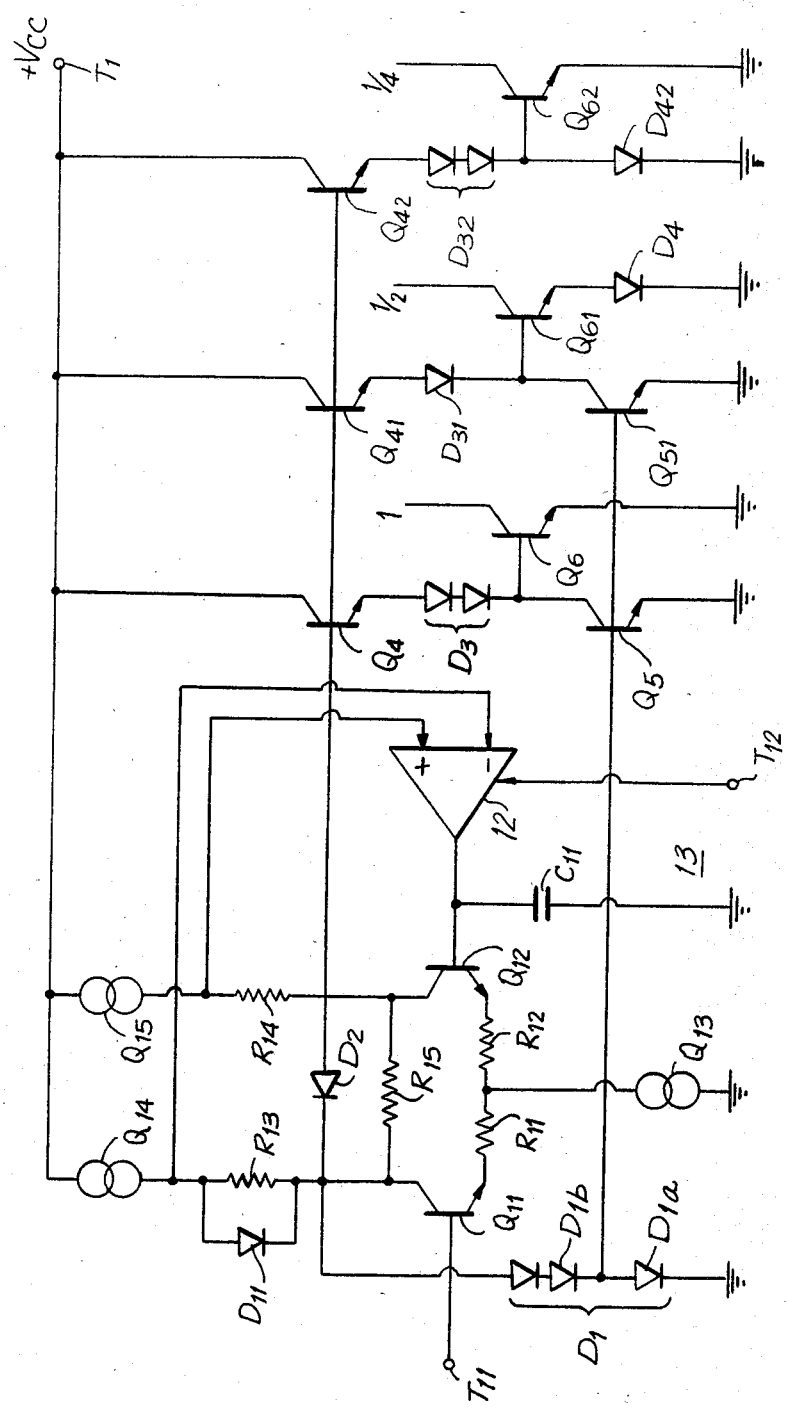
FIG. 4 is a circuit diagram of a gamma compensation circuit according to another embodiment of the present invention.

Another embodiment of the present invention is shown in FIG. 4 in which the compensated output signals are exponentially compensated to different powers of the input signal, specifically, the exponential power of one, one-half, and one-fourth. In this embodiment the numbers of diodes are selected based upon the following parameters: $N=4$, $K=1$, $J=1$, and $J_1=2$. Transistors $Q_{42}$, $Q_{52}$, and $Q_{62}$ and diode $D_{32}$ are connected in the exact same fashion as were transistors $Q_4$, $Q_5$, and $Q_6$ and diode $D_3$, respectively, in FIG. 2. Diode circuit $D_{42}$ is provided with a number of diodes given by $J_2$, which in this example equals 1. Resistors $R_{13}$ and $R_{14}$ and diode $D_{11}$ provide a voltage offset to the input signal $i_1$ and also decrease the input impedance as seen across the inputs of integrated-circuit difference amplifier 12, which is connected across the collector circuits of the differential-amplifier transistor pair $Q_{11}$ and $Q_{12}$, and thereby improves the frequency response characteristics. Otherwise, the gamma-compensation circuit of FIG. 4 operates in the same fashion as described in relation to FIG. 2, with the exception that the additional exponential powers are made possible by the added output stages.

In the gamma compensation circuits of FIGS. 2 and 4 since such compensation is provided by the series-connected diode circuits, when the number of such diodes changes, the temperature characteristics of the output current $I_6$ or $I_{61}$ will also change. In the embodiment of the present invention shown in FIG. 5, this changing of the temperature characteristic of the output current $I_6$ is eliminated.

Equation (10) above that described the embodiment of FIG. 2 can be rewritten as:

$$i_6 = I_2^{1-(K/J)} i_1^{K/J} \quad (12)$$

provided that the temperature characteristics of currents $I_1$ and $I_2$ are different such that current $I_1$ will change to $(1+a)I_1$ and current $I_2$ will change to $(1+b)I_2$. Thus, when the temperature changes by an increment $\Delta T$, equation (12) will become:

$$i_6 = [(1 + b)I_2]^{1-(K/J)} [(1 + a)i_1]^{K/J} \qquad (13)$$
$$= (1 + b)^{1-(K/J)} (1 + a)^{K/J} I_2^{1-(K/J)} i_1^{K/J}$$

Equation 13 then represents that the temperature characteristic of the compensated output current $I_6$ will change according to the number of diodes K and J and, moreover, this exact same temperature compensation characteristic will be present for current $I_{61}$, as well. Furthermore, because the temperature characteristics of the compensated output currents $I_6$ and $I_{61}$ depend upon the number of diodes K, J and K, $J_1$, respectively, the temperature characteristics of current $I_6$ will differ from the characteristic of current $I_{61}$ when J does not equal $J_1$. As a result of this, the sum of the output currents of the circuit shown in FIG. 2 or in FIG. 4 can not be standardized because of the difference of temperature characteristics among and between the plurality of output signals. Nevertheless, this is standardized in the circuit of FIG. 5, in which current $I_2$ that flows through the diode circuit $D_1$ is detected and the detected signal is fedback to the current source $Q_{14}$ to maintain current $I_2$ at a reference value $I_r$.

Figure 5:
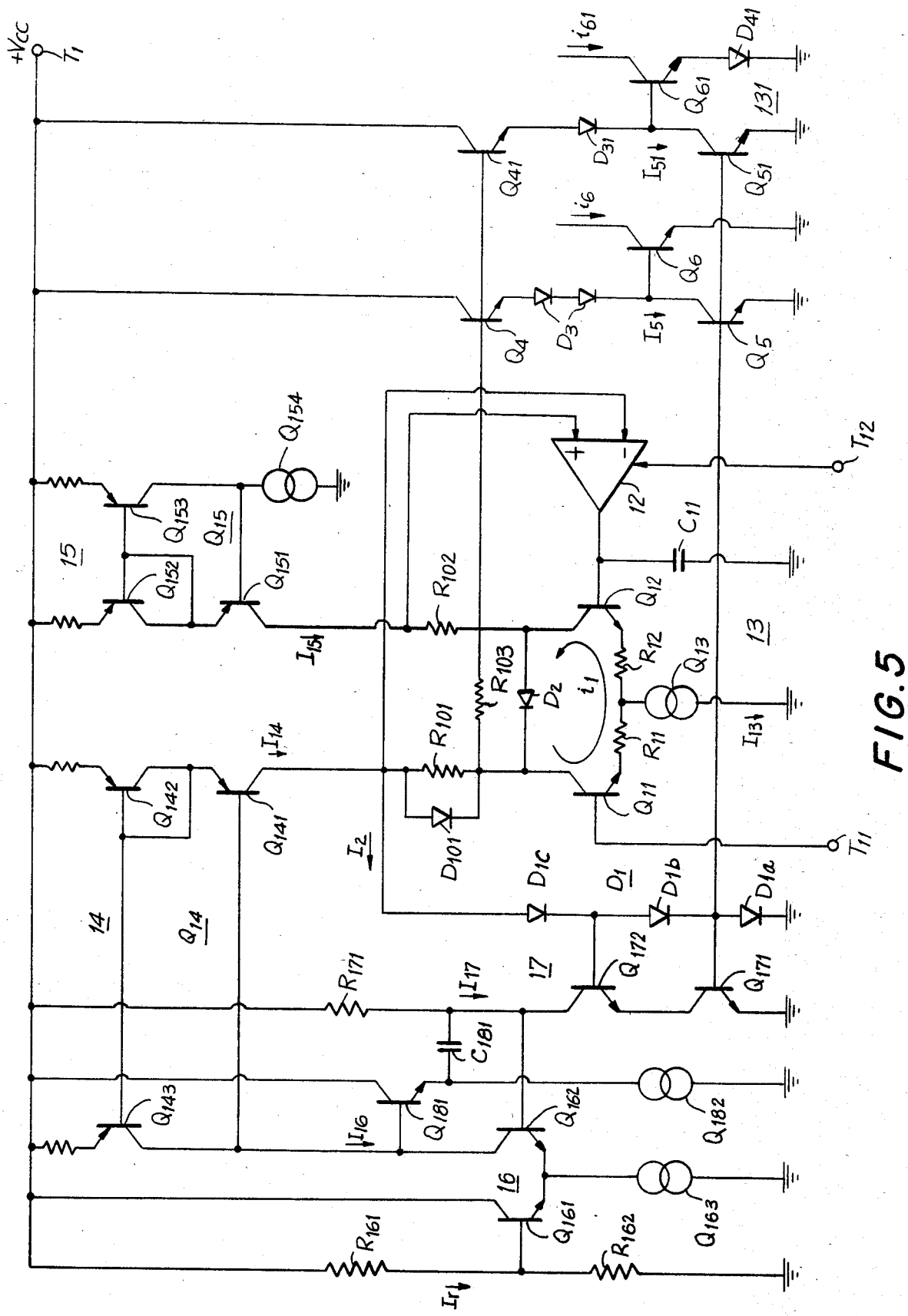
FIG. 5 is a circuit diagram of a further embodiment of a gamma-compensation circuit according to the present invention.

In the embodiment of FIG. 5 there are three diodes $D_1$ provided, specifically, diodes $D_{1a}$, $D_{1b}$, and $D_{1c}$ and a single diode $D_2$ interconnecting the collector leads of the differential amplifier input circuit and two diodes $D_3$ connected in the output circuit formed by transistor $Q_4$. There is no diode $D_4$ in this embodiment in the emitter circuit of the output transistor $Q_6$, and single diodes are each connected in the collector circuits of transistors $Q_{41}$ and $Q_{61}$. From FIG. 5 and the above it is seen that the parameters utilized in the circuit of FIG. 5 are: N=4, K=1, J=1, and $J_1$=2. As in the embodiment of FIG. 4, resistors $R_{101}$ and $R_{102}$ and diode $D_{101}$ are connected in the collector circuits of differential amplifier transistors $Q_{11}$ and $Q_{12}$, respectively, and an additional resistor $R_{103}$ is also provided in the base input circuit of transistor $Q_4$. These additional circuit elements are provided for the same reason as in the embodiment of FIG. 4, that is, to provide a voltage offset to input luminance signal current $I_1$ and also to decrease the input impedance seen by the inputs of integrated circuit comparator 12, as across the collectors of the differential transistor pair $Q_{11}$ and $Q_{12}$, thereby improving the frequency characteristics of the entire circuit.

A current-mirror circuit is connected in the collector circuit of transistor $Q_{12}$ and includes transistors $Q_{151}$, $Q_{152}$, and $Q_{153}$ that are connected to be driven by constant-current source $Q_{154}$. Transistors $Q_{151}$, $Q_{152}$, and $Q_{153}$ that make up current-mirror circuit $Q_{15}$ are connected in the conventional fashion and the appropriate bias voltage is obtained by connections in the emitter circuits to the bias voltage $V_{cc}$. Note that this is a specific embodiment of constant-current source $Q_{15}$ employed in the embodiments of the invention shown in FIGS. 2 and 4. Similarly, the current-mirror circuit $Q_{14}$ connected to the collector circuit of transistor $Q_{11}$ comprises transistors $Q_{141}$, $Q_{142}$, and $Q_{143}$ connected in the conventional fashion and are also connected to the bias voltage $V_{cc}$ through respective emitter resistors. Current-mirror circuit $Q_{14}$ is then operably connected to differential amplifier 16 formed of transistors $Q_{161}$ and $Q_{162}$, the collectors of which are both connected to ground potential through constant current source $Q_{163}$, and resistors $R_{161}$ and $R_{162}$ form a voltage divider to provide the necessary bias to the base of transistor $Q_{161}$. In order to detect the current $I_2$ that flows through diode circuit $D_1$, a current-mirror circuit is provided that is connected to the junctions of the three diodes making up the series-connected diode circuit $D_1$. Specifically, the current mirror is formed of transistors $Q_{171}$ and $Q_{172}$ having their base leads connected across diode $D_{1b}$ in diode circuit $D_1$. That is, the base of transistor $Q_{171}$ is connected to the junction between diodes $D_{1a}$ and $D_{1b}$, and the base of transistor $Q_{172}$ is connected to the junction between diodes $D_{1b}$ and $D_{1c}$. The current mirror circuit 17 is connected to the input or base lead of differential amplifier 16 by connecting the collector lead of transistor $Q_{172}$ to the base lead of transistor $Q_{162}$ and the collector lead is also connected to the bias supply voltage terminal $T_1$ through bias/load resistor $R_{171}$. The output of transistor $Q_{162}$ is fedback to the input or base lead thereof by means of an emitter follower feedback circuit formed of transistor $Q_{181}$ and capacitor $C_{181}$. Specifically, transistor $Q_{181}$ has its emitter lead connected to a constant-current source 182, and the base lead connected to the collector lead of transistor $Q_{162}$, through a capacitor $C_{181}$ in order to prevent oscillation.

Therefore, since the current-mirror circuit 17 operates as a current mirror in conjunction with diode string $D_1$, then the equality that current $I_{17}$=current $I_2$ can be made. Similarly, since the collector current $I_{16}$ of transistor $Q_{162}$ is also the collector current of transistor $Q_{143}$, that is, the current-mirror circuit 14, then it can be stated that current $I_{14}$, which is the output of current mirror 14, is equal to the current $I_{16}$. If it is assumed that current $I_2$ increases then, based upon the above relation, current $I_{17}$ will similarly increase and a increase in current $I_{17}$ will result in a decrease in current $I_{16}$, because the base voltage of transistor $Q_{162}$ must decrease when a current $I_{17}$ increases. Accordingly, from the above relationship current $I_{14}$ will also decrease and when current $I_{14}$ decreases, from equation (7) hereinabove, it is seen that current $I_2$ will also decrease and thus provide negative feedback stabilization for the current $I_2$.

By choosing the values of resistors $R_{161}$ and $R_{171}$ to be equal, the reference current $I_r$ can be made to equal the current $I_2$ and, since:

$$I_r = V_{cc}/(R_{161}+R_{162}) \qquad (14)$$

then $$I_2 + V_{cc}/(R_{161}+R_{162}) \qquad (15)$$

Thus, equation (15) shows that the temperature characteristics of the current $I_2$ will depend principally upon the temperature characteristics of resistors $R_{161}$ and $R_{162}$.

On the other hand, the input signal current $i_1$, which is produced by applying the input signal voltage to be compensated to the terminal $T_{11}$, can be written as:

$$i_1 = V_1/(R_{11}+R_{12}) \qquad (16)$$

This equation (16) then also shows that the temperature characteristics of the input signal current $i_1$ depend principally upon the temperature characteristics of resistors $R_{11}$ and $R_{12}$. Accordingly, temperature characteristics of currents $I_2$ and $i_1$ depend upon the temperature characteristics of the respective resistor circuits. In modern integrated circuit fabrication technology, the temperature characteristics of resistors $R_{161}$, $R_{162}$, $R_{11}$, $R_{12}$ can be made equal quite easily during fabrication.

Therefore, referring back to equation (13) it may be seen that "a" can be made equal to "b".

Therefore, equation (13) can be rewritten as follows:

$$i_6 = (1 + b)^{1-(K/J)}(1 + a)^{K/J}I_2^{1-(K/J)}i_1^{K/J} \quad (17)$$
$$= (1 + a)^{1-(K/J)}(1 + a)^{K/J}I_2^{1-(K/J)}i_1^{K/J} \quad (18)$$
$$= (1 + a)I_2^{1-(k/J)}i_1^{K/J} \quad (19)$$

equation (19) then represents that the temperature characteristics of the gamma-compensated current $I_6$ are not influenced by the number of diodes J and K because the term (1+a) does not includes an exponential component of K or J. Equation (19) also shows that the temperature characteristics of current $I_6$ are substantially equal to those of current $I_1$. Similarly, the above statements can also be made in regard to the output current.

Accordingly, the nonlinear circuit shown in FIG. 5 has a gamma-compensation characteristic that is not influenced by the number of diodes J and K that are essentially used to provide the desired nonlinear characteristics. Moreover, all of the output currents provided by the nonlinear circuit shown in FIG. 5 have the same temperature characteristics so that the output currents can be added together to provide any desired nonlinear output curve, because the sum of these output signals will have the same temperature characteristics as each of its components parts and is thus standardized.

Although illustrative embodiments of the present invention have been described in detail hereinabove, it is to be understood that the invention is not limited to such precise embodiments and that various changes and modifications can be effected therein by one skilled in the art without departing from the spirit or scope of the invention, as defined in the appended claims.

What is claimed is:

1. A circuit having a nonlinear response characteristic for compensating an input signal, comprising:
   differential amplifier means receiving said input signal at one input and producing an output signal therefrom at an output;
   a first diode circuit connected between said differential amplifier means output and a reference potential;
   first current-source means connected to supply a constant current to said differential amplifier means and also to said first diode circuit;
   a second diode circuit connected to said differential amplifier means output;
   current maintenance means connected to said first diode circuit and to said second diode circuit for maintaining a current flow in said second diode circuit equal to a current flow in said first diode circuit;
   a third diode circuit; and
   output circuit means having an input connected to said second diode circuit and being connected to said reference potential through said third diode circuit for producing an output signal representing said input signal having been nonlinearly compensated.

2. A circuit having a nonlinear response characteristic according to claim 1, in which said differential amplifier means comprises a transistor pair and further comprises a fourth diode circuit connected between respective collector circuits thereof, said first diode circuit being connected to a collector circuit of one transistor of said pair and said output of said differential amplifier means being taken at a collector circuit of the other transistor of said pair, said input signal being fed to one base circuit and a feedback means being connected to the other base circuit of said transistor pair to maintain a balance between the collector circuits of said transistors pair of said differential amplifier means.

3. A circuit having a nonlinear response characteristic according to claim 2, in which said feedback means comprises a difference amplifier having an additive input connected to one of said collector circuits of said transistor pair and having a subtractive input connected to the other of said collector circuits of said transistor pair for producing an output signal representative of a difference between said two inputs and being fed to said other base circuit of said transistor pair forming said differential amplifier means, and a capacitor connected to receive said output signal of said difference amplifier and connected to said reference potential.

4. A circuit having a nonlinear response characteristic according to claim 3, in which said input signal is a video luminance signal and a clamping synchronization signal is fed to an additional input of said difference amplifier, whereby said output signal of said difference amplifier constitutes a clamping level output in response thereto.

5. A circuit having a nonlinear response characteristic according to claim 4, in which said fourth diode circuit comprises K series-connected diodes, where K is a positive integer.

6. A circuit having a nonlinear response characteristic according to claim 2, in which said fourth diode circuit comprises K series-connected diodes and in which said first diode circuit comprises (N-K) series-connected diodes, where N and K are positive integers.

7. A circuit having a nonlinear response characteristic according to claim 6, in which said current maintenance means is connected to a last one of said (N-K) series-connected diodes and is connected to said reference potential.

8. A circuit having a nonlinear response characteristic according to claim 7, in which said current maintenance means comprises a current-mirror circuit including at least one current-mirror transistor having a base lead connected to said last diode of said first diode circuit and a collector lead connected to said second diode circuit and to the input of said output circuit means.

9. A circuit having a nonlinear response characteristic according to claim 8, in which said output circuit means comprises a first output transistor having a base lead connected to the collector lead of said current-mirror transistor and in which said third diode circuit comprises (J-1) series-connected diodes, where J is a positive integer.

10. A circuit having a nonlinear response characteristic according to claim 9, in which said current-mirror circuit of said current maintenance means includes a second current mirror transistor having a base lead connected to the base lead of said first current-mirror transistor and a collector lead connected to a fifth diode circuit connected to said output of said differential amplifier means, and said output circuit means further comprises a second output transistor having a base lead connected to the collector lead of said second current-mirror transistor and an emitter lead connected to said reference potential through a sixth diode circuit.

11. A circuit having a nonlinear response characteristic according to claim 10, in which said fifth diode circuit means includes (N-J-1) series-connected diodes, where J is a positive integer.

12. A circuit having a nonlinear response characteristic for providing gamma compensation to an input video luminance signal, comprising:
first diode circuit means;
second diode circuit means;
a differential transistor amplifier formed of a pair of transistors and having said input signal connected to a base lead of a first transistor and having a collector lead thereof connected to a reference potential through said first diode circuit means, collector leads of the pair of transistors forming said differential transistor amplifier being interconnected through said second diode circuit means;
a current source connected to supply a constant current to said differential transistor amplifier and to said first diode circuit means;
a difference amplifier means having inputs connected respectively to said collector leads of said pair of transistors forming said differential transistor amplifier and providing an output difference signal fed to a base lead of a second transistor of said pair of transistors forming said differential transistor amplifier;
a capacitor connected to receive said output difference signal from said difference amplifier and being connected to said reference potential;
current-mirror circuit means connected to said first diode circuit means;
third diode circuit means connected to one of said collector leads of said pair of transistors forming said differential transistor amplifier and to an output of said current-mirror circuit means, wherein said current-mirror circuit means operates to cause a current flowing through said third diode circuit means to equal a current flowing through said first diode circuit means;
fourth diode circuit means; and
output circuit means connected to said third diode circuit means and being connected to said reference potential through said fourth diode circuit means for producing a circuit output signal that is a nonlinearly compensated reproduction of said input video luminance signal.

13. A circuit having a nonlinear response characteristic according to claim 12, in which said difference amplifier means has an additional input connected to receive a clamping synchronization signal, whereby said output difference signal constitutes a clamping level output fed to said differential transistor amplifier.

14. A circuit having a nonlinear response characteristic according to claim 12, in which said first diode circuit means includes (N-K) series-connected diodes, said second diode circuit means includes (K) diodes, said third diode circuit means includes (N-J-1) series-connected diodes and said fourth diode circuit means includes (J-1) series-connected diodes where N, K, and J are positive integers.

15. A circuit having a nonlinear response characteristic according to claim 14, in which said current-mirror circuit means is connected to a last one of said (N-K) series-connected diodes forming said first diode circuit means and is connected to said reference potential.

16. A circuit having a nonlinear response characteristic according to claim 15, in which said current-mirror circuit means comprises a first current-mirror transistor having a base lead connected to said last diode of said first diode circuit means and a collector lead connected to said third diode circuit means and to the input of said output means.

17. A circuit having a nonlinear response characteristic according to claim 16, in which said output circuit means comprises a first output transistor having a base lead connected to the collector lead of said first current mirror transistor.

18. A circuit having a nonlinear response characteristic according to claim 17, in which said current-mirror circuit means includes a second current-mirror transistor having a base lead connected to the base lead of said first current-mirror transistor and a collector lead connected to a fifth diode circuit means which is connected to said collector lead of said one of said pair of transistors forming said differential transistor amplifier whereat said third diode circuit means is connected and said output means comprises a second output transistor having a base lead connected to the collector lead of said second current-mirror transistor and an emitter lead connected to said reference potential through a sixth diode circuit means.

19. A circuit having a nonlinear response characteristic according to claim 18, in which said sixth diode circuit means includes $(J_1-1)$ series-connected diodes, where $J_1$ is a positive integer.

20. A gamma-compensation circuit having a nonlinear response characteristic for providing gamma compensation to a video luminance signal, comprising:
differential amplifier means receiving said video luminance signal at one input thereof for producing an output signal therefrom at an output;
a first series-connected diode circuit connected between said differential amplifier means output and a reference potential;
current-source means connected to supply a constant current to said differential amplifier means and to said first series-connected diode circuit;
a second series-connected diode circuit connected to said differential amplifier means output;
current-mirror circuit means connected to an output of said first series-connected diode circuit and to an output of said second diode series-connected circuit for causing the current flowing through said second diode circuit to equal the current flowing in said first series-connected diode circuit; and
output means including a first output transistor having a base lead connected to the junction of said second series-connected diode circuit and said current-mirror circuit and having a third series-connected diode circuit connected between the emitter lead of said first output transistor and the reference potential, whereby a gamma-compensated video luminance signal current flows in the collector circuit of said first output transistor.

* * * * *